United States Patent

Brokholc

[11] Patent Number: 6,047,977
[45] Date of Patent: Apr. 11, 2000

[54] STEERING LOCK END-STOP FOR VEHICLES

[75] Inventor: Michal Brokholc, Göteborg, Sweden

[73] Assignee: AB Volvo, Sweden

[21] Appl. No.: 09/000,425

[22] PCT Filed: Jul. 17, 1996

[86] PCT No.: PCT/SE96/00960

§ 371 Date: Feb. 3, 1998

§ 102(e) Date: Feb. 3, 1998

[87] PCT Pub. No.: WO97/06046

PCT Pub. Date: Feb. 20, 1997

[30] Foreign Application Priority Data

Aug. 4, 1995 [SE] Sweden ................................. 9502750

[51] Int. Cl.⁷ ............................................. B62D 15/02
[52] U.S. Cl. ........................................................ 280/93.5
[58] Field of Search ............................ 280/93.5, 93.508, 280/93.502, 93.51, 89, 89.1; 180/257

[56] References Cited

U.S. PATENT DOCUMENTS

| 1,343,305 | 6/1920 | Caldwell | 74/496 |
| 3,981,513 | 9/1976 | Erskine | 280/93.5 |
| 4,327,927 | 5/1982 | Tanaka et al. | 280/124.13 |
| 4,330,052 | 5/1982 | Schymick | 192/143 |
| 4,536,003 | 8/1985 | Maurer et al. | 280/93.5 |
| 4,653,773 | 3/1987 | Graft | 280/93.5 |
| 4,660,845 | 4/1987 | Herr | 280/93.5 |
| 5,052,528 | 10/1991 | Sullivan | 188/317 |
| 5,435,590 | 7/1995 | Larsson . | |

FOREIGN PATENT DOCUMENTS 468 671  3/1993  Sweden .

Primary Examiner—Brian L. Johnson
Assistant Examiner—Michael Britton
Attorney, Agent, or Firm—Lerner, David, Littenberg, Krumholz & Mentlik, LLP

[57] ABSTRACT

Steering lock end-stops for vehicle wheel units are disclosed including a first abutment surface affixed to a first portion of the vehicle and a second abutment surface affixed to the wheel unit of the vehicle so that the second abutment surface is displaced with both steering and suspension displacements of the wheel unit. One of the abutment surfaces is a roller which is rotatable about a rotation axis which is fixed with respect to the first portion of the vehicle.

15 Claims, 4 Drawing Sheets

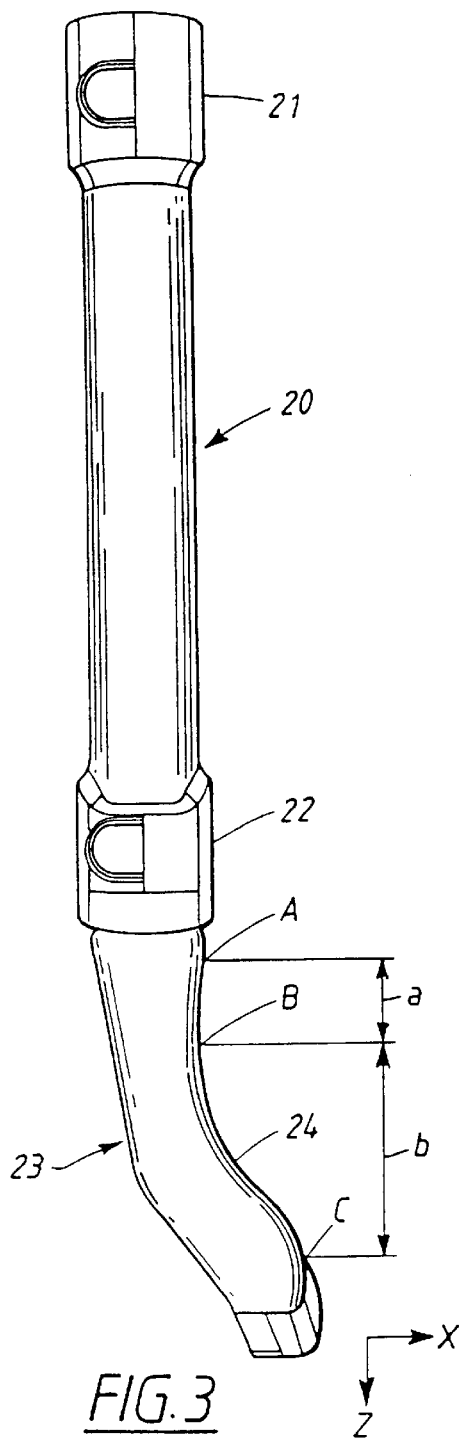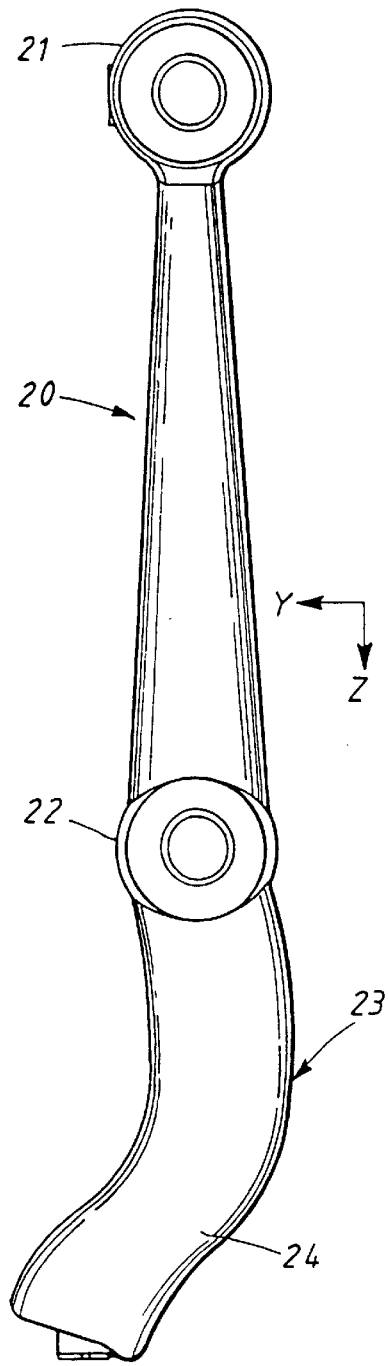

STEERING LOCK END-STOP FOR VEHICLES

FIELD OF THE INVENTION

The invention relates to a steering lock end-stop for a suspended and steerable vehicle wheel unit.

In particular, but not exclusively, the invention relates to sprung front wheel assemblies of light vehicles such as passenger cars, buses and trucks. The front wheel assemblies may also comprise driven wheels.

BACKGROUND TO THE INVENTION

A vehicle having a steering lock end-stop as defined in the preamble of claim 1 is known from the front wheel drive Volvo 850 passenger car. In this vehicle, an abutment member made of rubber is attached by rivets to the front surface of each of the wishbones on the front suspension.

The reason for having an end-stop is that when the steered wheels of a vehicle are turned to the maximum, i.e. when the steering is put on to full lock, it is important that the moving wheel rim or tire, or any other parts of the wheel unit, cannot come into contact with any other parts of the car. Thus by providing such an end-stop, the wheel is prevented from being turned too far. By making the end stop of rubber, any metal-to-metal contact between the abutting surfaces of the end stop and the steered part of the wheel can also be prevented, which helps to reduce noise.

Whilst such a solution is an improvement over previously existing systems, it has been noticed that with frequent driving on full lock, such end stops become worn and may require replacement. This is particularly the case with driving on full lock on uneven ground. Moreover such wear will occur, even though the two abutting surfaces undergo the same angular deflections as the vehicle suspension arm (since both abutting surfaces are attached directly or indirectly to the suspension arm).

Additionally, due to the contact between the metal and rubber parts, a creaking or juddering sound may be experienced.

The main object of the invention is thus to provide a solution to the aforementioned problems.

A further problem which also arises is that when the steering is on full lock and the vehicle is driven over uneven ground, the wheels and suspension may undergo large upward and downward movements. Unless suitable measures are taken, the wheels would come into contact with other stationary parts of the vehicle during such large suspension movements. This leads to noise and/or damage. Additionally, if the wheels are driven wheels as well as being steered wheels, it also needs to be ensured that the constant velocity joints (CV-joints) are not subjected to angles outside their range of operation. These difficulties can be avoided in the prior art by providing the end stop at a location which is positioned so as to limit turning of the wheel to a fixed amount which prevents all possible contact at all suspension deflections. At the same time, the chosen location should also prevent excessive angular displacements between the input and output shafts of the CV-joints. However, the result of this end-stop positioning is that the turning circle for the vehicle is then somewhat larger than is actually required when driving on even ground with the suspension in its normal position.

A larger turning circle makes the car less-easily manouevrable and is thus undesirable.

Thus, in a preferred aspect, it is a further object of the invention to solve this problem, so that a tighter turning circle can be achieved without compromising the ability of the end-stop to prevent contact of the wheel with other parts of the vehicle.

SUMMARY OF THE INVENTION

In accordance with the present invention, these and other objects have now been realized by the invention of a steering lock end-stop for a suspended and steerable wheel unit which comprises a first abutment member affixed to a first portion of the vehicle, and a second abutment member at a location selected for abutment with the first abutment member and affixed to the suspended and steerable wheel unit, whereby the second abutment member is correspondingly displaced with both steering and suspension displacement of the wheel unit, one of the first and second abutment members comprising a roller rotatable about a rotation axis which is fixed with respect to the first portion of the vehicle. Preferably, the one of the first and second abutment members comprises the first abutment member. In a preferred embodiment, the first portion of the vehicle comprises a portion of the vehicle which is correspondingly displaced with vertical movements of the wheel unit.

In accordance with another embodiment of the steering lock end-stop of the present invention, the first portion of the vehicle comprises a suspension arm of the wheel unit.

In accordance with another embodiment of the steering lock end-stop of the present invention, the first portion of the vehicle comprises a chassis member of the vehicle.

In accordance with a preferred embodiment of the steering lock end-stop of the present invention, the first portion of the vehicle includes a recess, and the first abutment member is located at least partially within the recess. Preferably, the rotation axis of the roller comprises a bolt extending across that recess.

In accordance with another embodiment of the steering lock end-stop of the present invention, the roller includes an outer peripheral coating. Preferably, the outer peripheral coating comprises hard rubber or plastic.

In accordance with another embodiment of the steering lock end-stop of the present invention, the roller includes an inner surface comprising a low friction material.

In accordance with another embodiment of the steering lock end-stop of the present invention, the second abutment member includes a curved abutment surface for cooperation with the outer surface of the roller. In a preferred embodiment, the curved abutment surface includes a curvature which varies vertically along the second abutment member. More preferably, the suspended and steerable wheel unit is attached to a separate arm, and the curved abutment surface is disposed on that separate arm. In a preferred embodiment, the separate arm includes a free end extending from an attachment point at which the separate arm is attached to the suspended and steerable wheel unit, the free end extending downwardly and towards the rear of the wheel unit. In a most preferred embodiment, the wheel unit includes a substantially vertical plane therethrough, and the separate arm includes a top and a bottom, whereby as viewed from the front of the vehicle a point moving along the curved abutment surface from the top of the free end of the separate arm to the bottom of the free end of the separate arm will define a curve towards the substantially vertical plane up to a predetermined intermediate point between the top and the bottom of the free end of the separate arm and away from the substantially vertical plane from that predetermined point to the bottom of the free end of the separate arm.

In accordance with the invention as defined, one of the abutment portions is formed by a rotatable roller. In this way, relative motion between the abutting surfaces, as a result of suspension deflections caused by vertical movements of the wheel, will be transformed into a rotation of the roller about its fixed shaft.

It may be decided to have the first abutment portion positioned on a suspension arm (e.g. a wishbone of a wishbone suspension) and the second abutment portion fixed to the wheel unit's swivel axle. Even though, in turn, the swivel axle is fixed via a ball-joint to the wishbone, relative movement between the abutment portions will still occur. This is so, despite the fact that both of these abutment portions undergo the same angular deflections as the wishbone, because of the difference in the length from the pivot point of the wishbone on the chassis to the point of attachment of each of said abutment portions.

In order to minimise relative motion, the location of the first abutment portion outwardly along the suspension arm (i.e. radially outwardly with respect to the pivotal attachment point of the arm to the chassis) is somewhat restricted since it must be relatively close to the wheel plane. However, by means of this invention, the first abutment member may be located on any suitable part of the vehicle (either stationary or movable with the suspension) since the problems encountered as a result of relative motion are overcome.

BRIEF DESCRIPTION OF THE DRAWINGS

The invention will now be described in more detail with respect to certain non-limiting embodiments of the invention depicted in the accompanying drawings, in which:

FIG. 3 shows an end view of an embodiment of an abutment portion designed to cooperate with said roller, FIG. 4 shows the abutment portion of FIG. 3 in a side view.

DETAILED DESCRIPTION OF PREFERRED EMBODIMENTS

Figure 1:
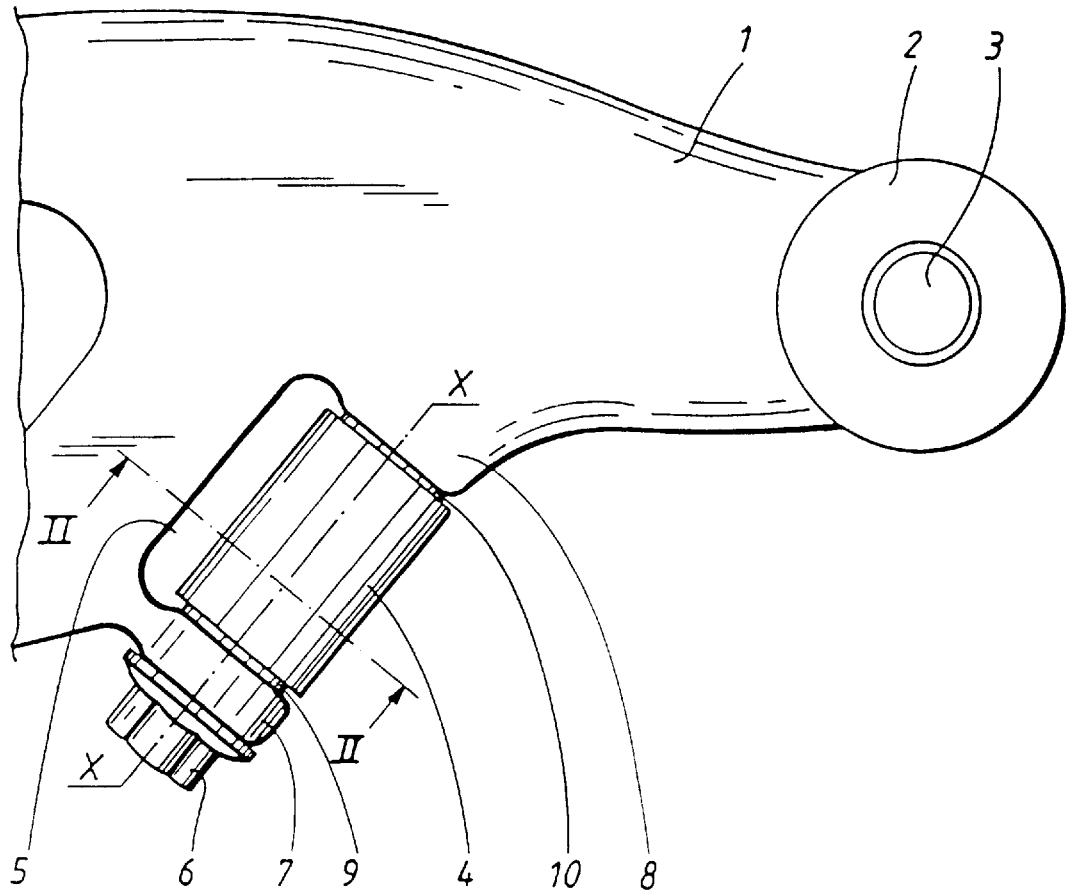
FIG. 1 shows a plan view of an outer portion of a lower suspension arm of a vehicle front suspension for a steered wheel unit, with an abutment portion in the form of a roller.

FIG. 1 shows a plan view of a lower suspension arm 1, e.g. a wishbone, of a vehicle. A ball-joint connection site 2 with a hole 3 therethrough for a ball-joint attachment stub (not shown) is arranged at the outer end of the suspension arm. At the front side of the suspension arm, as seen in the direction of forward vehicle motion, there is a first abutment member in the form of a roller 4 which is rotatably attached to a first part of the vehicle. The wishbone has been specially adapted so that the roller is arranged in a recess 5 of the suspension arm and is able to rotate about an axis X—X. The axis X—X is fixed relative to the wishbone and is preferably formed by a shaft extending across the recess 5.

In the depicted embodiment, the axis of rotation X—X is formed by a bolt 30 (see FIG. 2), the head 6 of which is visible in FIG. 1. The bolt passes through a drilling in a projecting part 7 of the wishbone, through the central opening in the roller and into a threaded bore in part 8 of the wishbone.

If required, shims or washers (not shown) may be provided on either side of the roller's end faces so as to ensure a rotation of the roller with respect to the inner surfaces of the portions 7 and 8.

The location chosen for the abutment roller on the wishbone is preferably at the front as shown, although other locations of the roller on the suspension arm are also possible. For example, the roller can be placed on a lower or upper surface of the suspension arm. Alternatively the roller may be fixed to a stationary part of the vehicle, such as one of the forward structural members. Such a placement will be explained in connection with FIG. 5 below.

The roller 4 itself can be formed with an outer surface of any suitable material such as plastics or metal for example. However the outer surface is preferably formed of hard rubber (i.e. rubber having a Shore hardness of about 80 or more) so that noise due to contact between the roller abutment surface and the opposing abutment surface is reduced.

Whilst only one suspension arm is shown, it should also be understood that the roller is normally fitted to both sides of the vehicle at the same location so that steering lock end-stops will be provided in both directions of movement. As an alternative, a roller could for example be provided on both sides of only one of the suspension arms with suitable cooperating second abutment surfaces being provided.

When driven on full lock over uneven ground, the relative movement between the abutting surfaces of the roller 4 and the cooperating abutment surface (see below) is converted into a rotation of the roller 4 and noise and juddering effects are substantially obviated.

Figure 2:
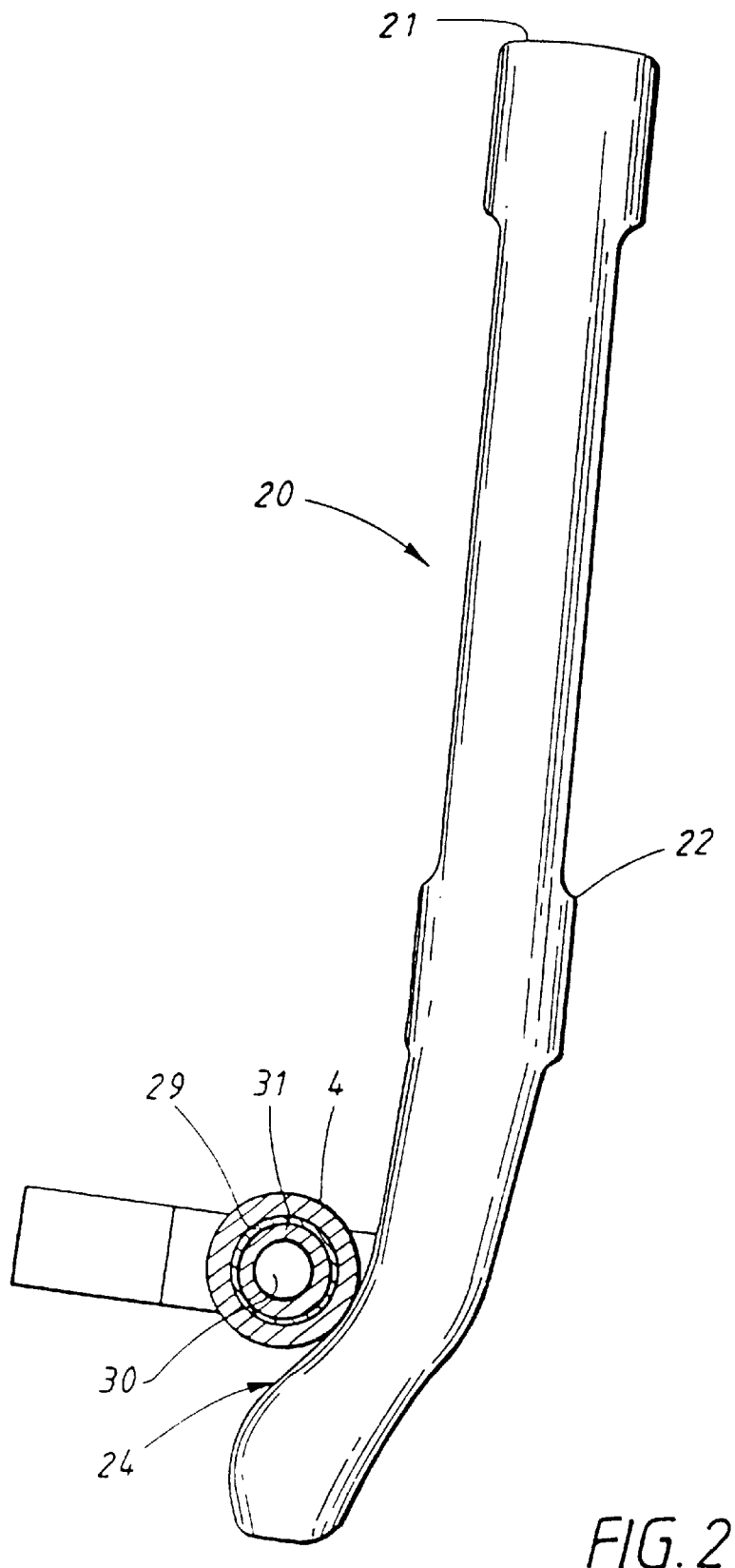
FIG. 2 shows a cross-sectional view through a roller of FIG. 1 but additionally shown in a position of abutment with a second abutment portion, along a line II—II of FIG. 1 and FIG. 6.

FIG. 2 shows a sectional view of a preferred embodiment of the first abutment means along line II—II in FIG. 1 and additionally in connection with a second abutment member (as shown more completely in later FIG. 6). As can be seen in this figure, the bolt 30 having head 6 (see FIG. 1) is in the centre of the first abutment means. Around the bolt 30 is an optional cylindrical sleeve 31, the ends 9 and 10 of which can be seen in FIG. 1. The sleeve 31 is preferably tightly clamped between surfaces of 7 and 8 and it may be made, or coated with, plastics or metal. Additionally the sleeve will preferably be formed with an outer smooth surface. The roller 4 of the first abutment means preferably has a liner 29 fixedly attached to the hollow inside thereof, said liner being of a low friction material. In such a manner a smooth and yet robust rolling arrangement is achieved.

The abutment surface 24 which cooperates with the roller 4 is formed by a second abutment portion 20 which is united with a steered portion of a wheel unit, said abutment portion 20 thus being displaced in unison with the steering and suspension movements of said wheel unit. Such a steered portion of the wheel unit would most typically be the swivel axle 36 or stub shaft of a front wheel (see FIG. 6).

The second abutment portion 20 being "united" with a steered portion of the wheel unit is intended to mean that the second abutment portion may be either integrally formed with said steered portion (e.g. by being cast therewith) or that said abutment portion is attached thereto in some way by e.g. welding or bolts for example. However, in a preferred embodiment of the invention, the second abutment portion is formed by a lower portion of an arm generally denoted by reference numeral 20 in FIG. 3, said arm 3 being attached to e.g. the swivel axle 36 at locations 21 and 22 typically by means of bolts (not shown). Below the lower attachment location 22, the arm 20 has a free end, generally denoted 23. The surface of the arm which will abut the roller 4 is denoted by numeral 24.

As will be seen when comparing the elevation and side views of FIGS. 3 and 4, the surface 24 extends both in the Y and Z-directions in a curved manner from the attachment point 22. The arm shown is intended for use as the arm on the front passenger side of a right-hand drive vehicle. Thus, the free end 23 will extend rearwardly on the vehicle from the attachment locations 21 and 22.

The curved surface has a width and a shape in the Y-direction which allows it to abut the roller 4 on full lock at all suspension deflections for the particular vehicle concerned without interfering with the suspension arm 1.

In a preferred embodiment of the invention, the second abutment portion, formed by the free end 23, has an abutment surface 24 which is not flat but curved with a particular curvature in the X-direction (see FIG. 3) which varies vertically (in the Z-direction) along said portion.

The curvature in the X-direction (i.e. the variations in the X-direction of a point on the abutment surface 24 moving in the Z-direction) has been shown in FIG. 3 as divided into two main sections "a" and "b". Taking the wheel plane as a reference plane for example (which will be to the left of the arm in FIG. 3), the curvature of surface 24 is such that a point on the surface 24 will move towards the plane when moving along section "a" from point A to point B. The point will then move outwardly in the X-direction in section "b" from point B to point C.

When the vehicle is driven on even ground at full lock, the roller 4 will normally abut the surface 24 approximately at abutment contact point B (dependent on vehicle loading). As will be appreciated, this allows the wheels to be turned to a maximum steering angle and thus to provide a minimum turning circle. When however the vehicle is driven at full lock and the suspension deflects upwardly or downwardly (e.g. due to uneven ground), the abutment contact point will move along the sections "a" or "b" respectively and the wheels will consequently be forced to assume a reduced steering angle by the varying curvature of the arm. The purpose of this is so that contact between any wheel parts and stationary parts (e.g. chassis side member) can be avoided at all suspension deflections. In this way, a minimum turning circle is ensured for all suspension positions whilst still preventing any undesired contact.

Depending to some degree on the steering geometry and flexibility of the steering linkage, the vehicle driver will also normally not feel any feedback through the steering wheel as a result of the wheels undergoing such a steering angle reduction as described.

When a driven and steered wheel is involved, as is the case with the arm 20 depicted, the shape of the surface is also designed so as to prevent the CV-joints from being subjected to angles outside their operating limits.

It should be noted that the exact curvature of the abutment surface which contacts the roller will require adaptation to the vehicle concerned, but in many cases it will generally conform to the shape described.

Whilst in the preferred embodiment described above the roller 4 is attached to the wishbone 1 and the second abutment member 20 is attached to the swivel axle 36, it is also possible to kinematically reverse this relationship by arranging the roller 4 to be somewhere on the swivel axle and the second abutment surface on the wishbone.

Figure 5:
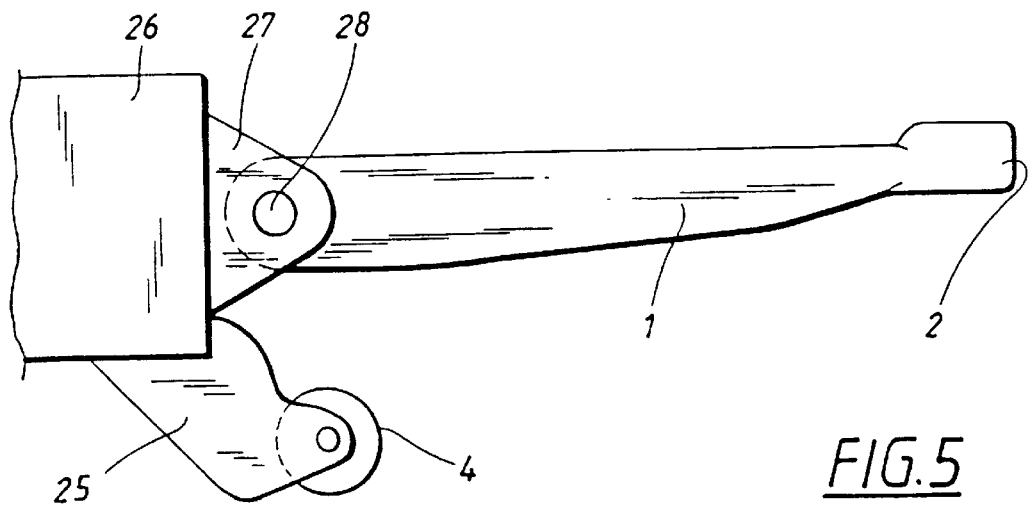
FIG. 5 shows an alternative placement of the roller member.

FIG. 5 depicts a further embodiment of the invention, in which the roller 4 is rotatably mounted in a bracket 25 which is attached to, or integral with, a chassis side member 26. The suspension arm 1 is shown, at its inner end, attached by means of a pivot 28 to a bracket 27 on the vehicle chassis.

With such an arrangement, the abutment portion united with the swivel axle (not shown in FIG. 5) would however normally have to be lengthened in order to make contact with said roller. Such is thus not preferred since greater use of material is involved and an increase in unsprung weight results.

Figure 6:
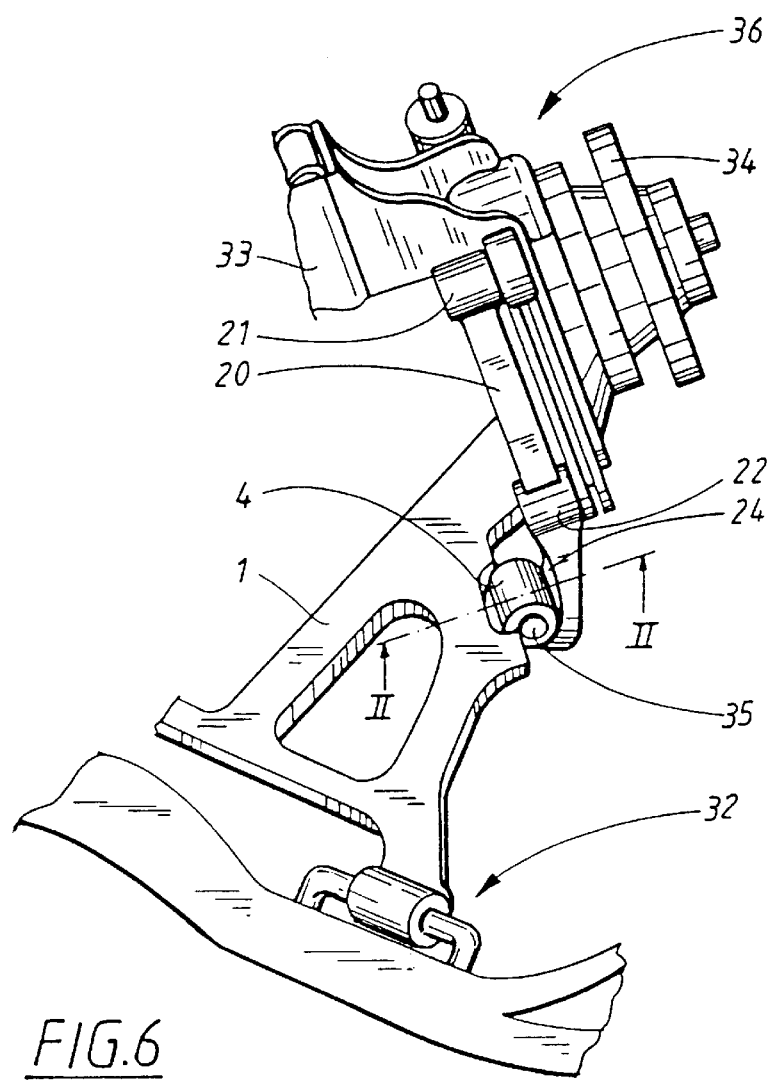
FIG. 6 shows a cut-away representation of the steering lock end-stop in a position of abutment.

FIG. 6 generally depicts a cut-away view from a three-quarter angle of a suspended vehicle wheel unit with certain parts omitted for clarity. The roller 4 and the cooperating abutment portion 23 (see FIG. 3 or 4) are shown in a position of abutment. In this figure, the arm 20 is attached to the vehicle swivel axle 36. A driven connection to a vehicle wheel rim is shown at 34, although the drive shaft and CV joint have been omitted for reasons of clarity.

The roller 4 has been shown as rotatably mounted on an axis 35 which itself is only supported at one end (i.e. it is free towards the viewing point). If such an embodiment is adopted, it should be ensured that the bending strength of the support is adequate to withstand the high normal forces from the abutment arm 20 which are generated during suspension movements at full lock. Said forces may typically be in the region of 12,000 N. For this reason, a rotation axis supported at both ends, corresponding to shaft 30 of the aforegoing figures is thus preferred.

The suspended, steered and driven wheel unit of FIG. 6 is substantially conventional in most other respects, the swivel axle 36 being supported by the upper 33 and lower 1 suspension arms. The lower suspension arm 1 is pivotally supported at its inner end on a pivot axis, one end of which is shown at 32.

Whilst the invention has been described with respect to certain embodiments thereof, the scope of the invention is not limited thereto but is defined by the appended claims.

What is claimed is:

1. A steering lock end-stop for a suspended and steerable vehicle wheel unit comprising a first abutment member affixed to a first portion of said vehicle and a second abutment member at a location selected for abutment with said first abutment member and affixed to said suspended and steerable wheel unit, whereby said second abutment member is correspondingly displaced with both steering and suspension displacements of said wheel unit, one of said first and second abutment members comprising a roller rotatable about a rotation axis which is fixed with respect to said first portion of said vehicle.

2. The steering lock end-stop of claim 1 wherein said one of said first and second abutment members comprises said first abutment member.

3. The steering lock end-stop of claim 2 wherein said first portion of said vehicle comprises a portion of said vehicle which is correspondingly displaced with vertical movements of said wheel unit.

4. The steering lock end-stop of claim 1 wherein said first portion of said vehicle comprises a suspension arm of said wheel unit.

5. The steering lock end-stop of claim 1 wherein said first portion of said vehicle comprises a chassis member of said vehicle.

6. The steering lock end-stop of claim 2 wherein said first portion of said vehicle includes a recess, and wherein said first abutment member is located at least partially within said recess.

7. The steering lock end-stop of claim 6 wherein said rotation axis of said roller comprises a bolt extending across said recess.

8. The steering lock end-stop of claim 1 wherein said roller includes an outer peripheral coating.

9. The steering lock end-stop of claim 8 wherein said outer peripheral coating comprises a member selected from the group consisting of hard rubber and plastic.

10. The steering lock end-stop of claim 1 wherein said roller includes an inner surface comprising a low friction material.

11. The steering lock end-stop of claim 2 wherein said second abutment member includes a curved abutment surface for cooperation with the outer surface of said roller.

12. The steering lock end-stop of claim 11 wherein said curved abutment surface includes a curvature which varies vertically along said second abutment member.

13. The steering lock end-stop of claim 12 wherein said suspended and steerable wheel unit is attached to a separate arm, and said curved abutment surface is disposed on said separate arm.

14. The steering lock end-stop of claim 13 wherein said separate arm includes a free end extending from an attachment point at which said separate arm is attached to said suspended and steerable wheel unit, said free end extending downwardly and towards the rear of said wheel unit.

15. The steering lock end-stop of claim 14 wherein said wheel unit includes a substantially vertical plane therethrough, and said separate arm includes a top and a bottom, whereby as viewed from the front of said vehicle a point moving along said curved abutment surface from said top of said free end of said separate arm to said bottom of said free end of separate arm will define a curve towards said substantially vertical plane up to a predetermined intermediate point between said top and said bottom of said free end of said separate arm and away from said substantially vertical plane from said predetermined intermediate point to said bottom of said free end of said separate arm.

* * * * *